Sept. 16, 1958
C. H. NORDELL
METHOD AND APPARATUS FOR REMOVING
UNDESIRED SOLUTES FROM LIQUIDS
2,852,464
Filed Feb. 24, 1953
7 Sheets-Sheet 5
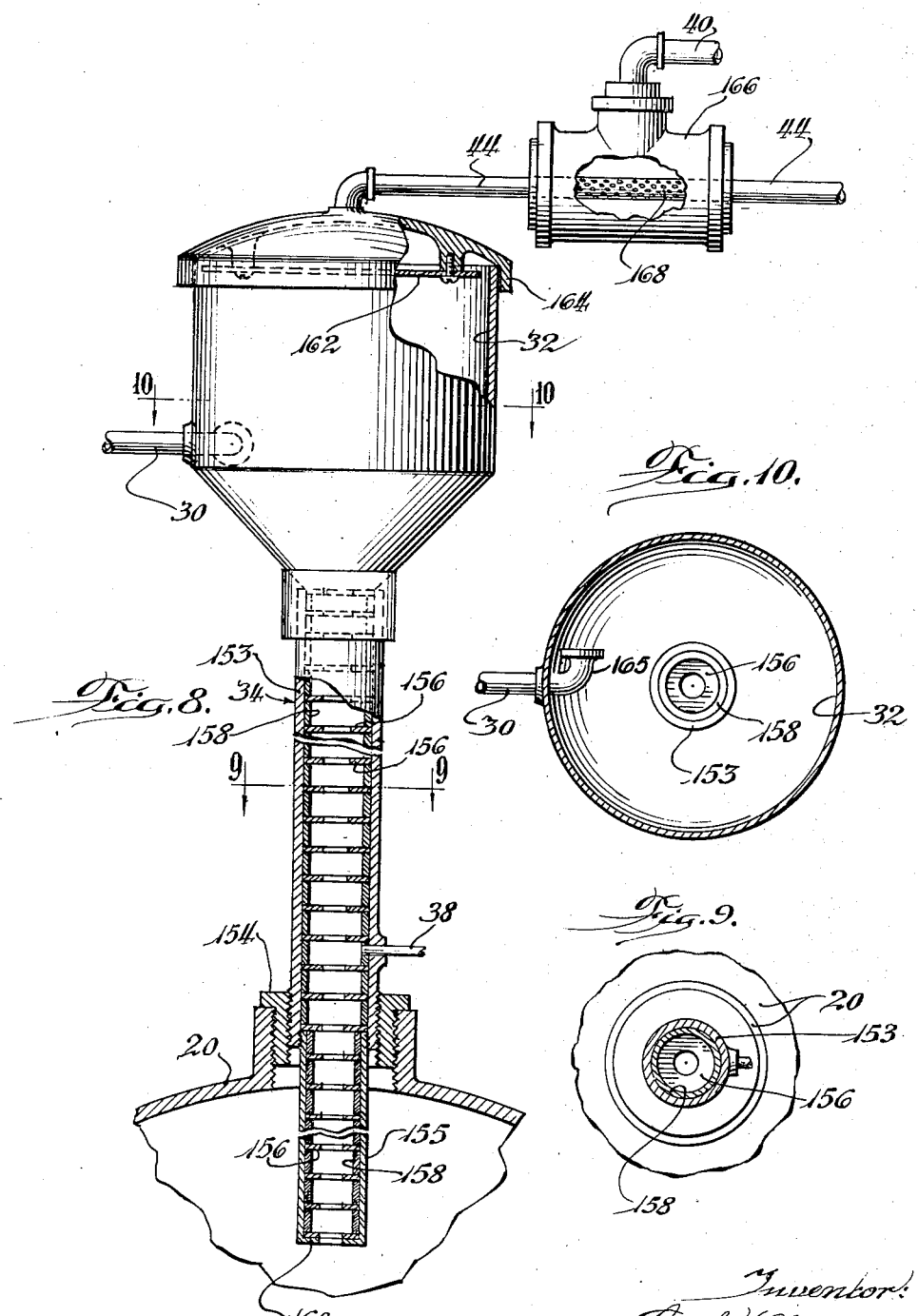
Inventor:
Carl H. Nordell
By Ahlberg, Wupper & Gradolph
Attorneys.

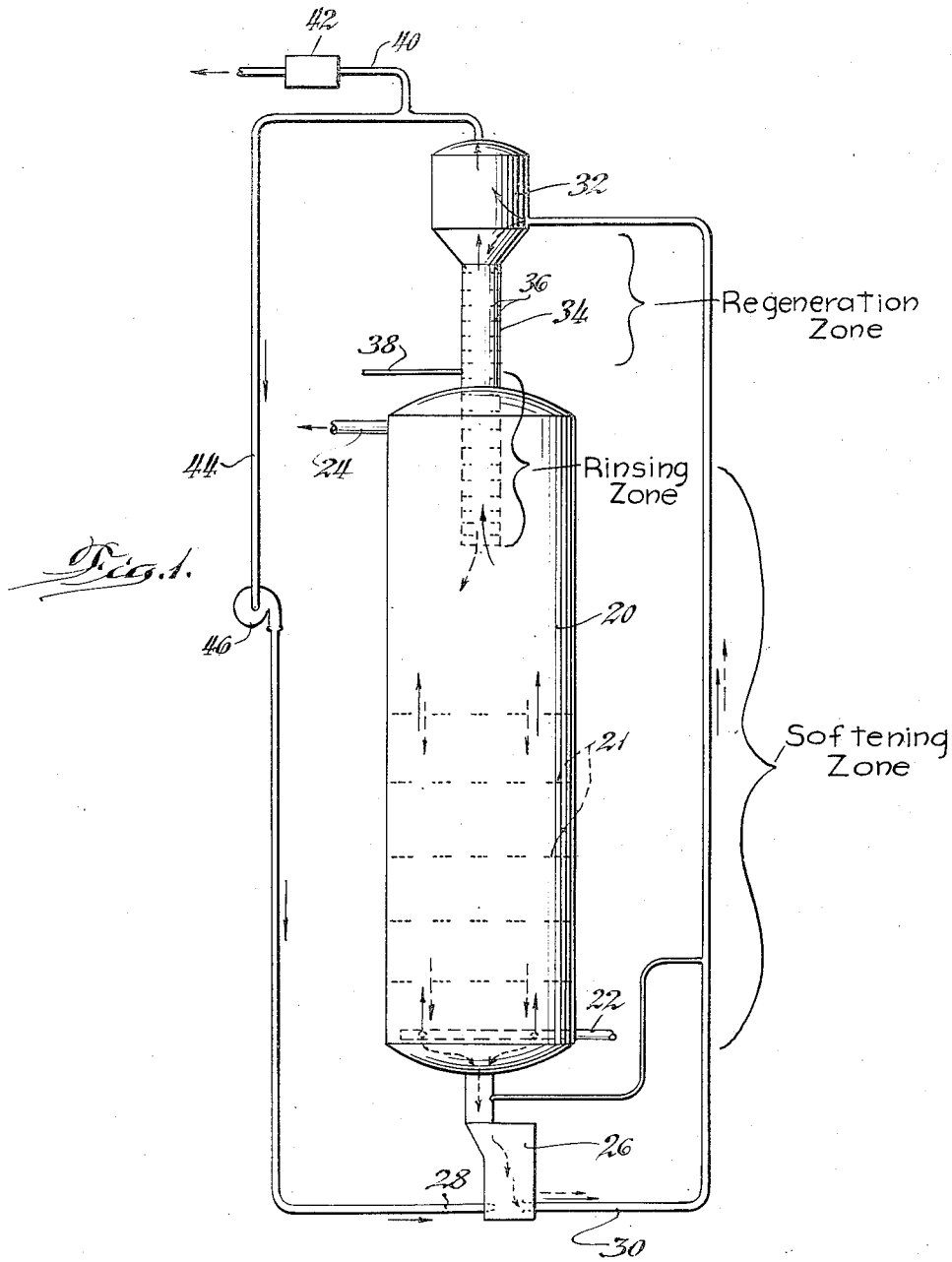

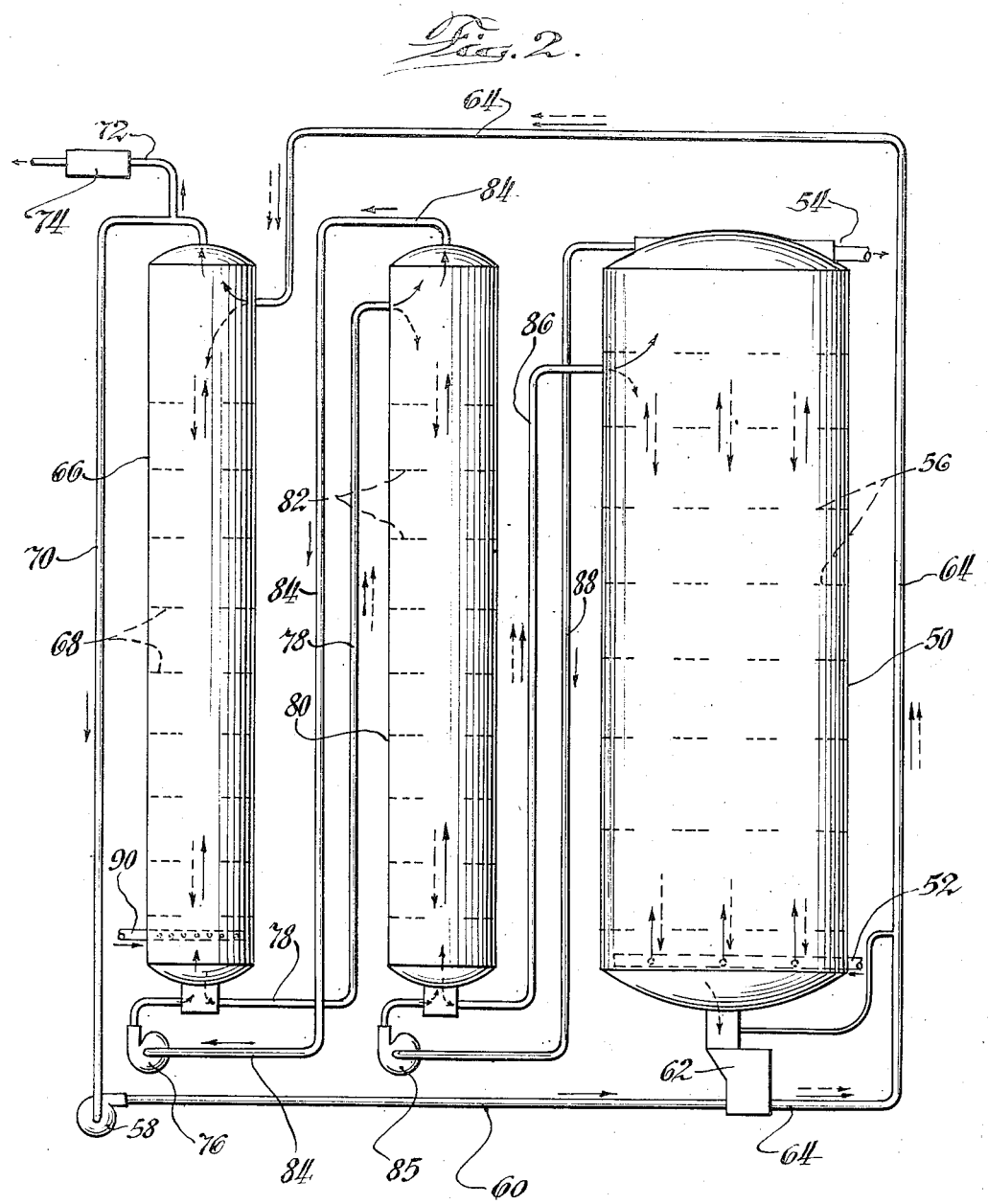

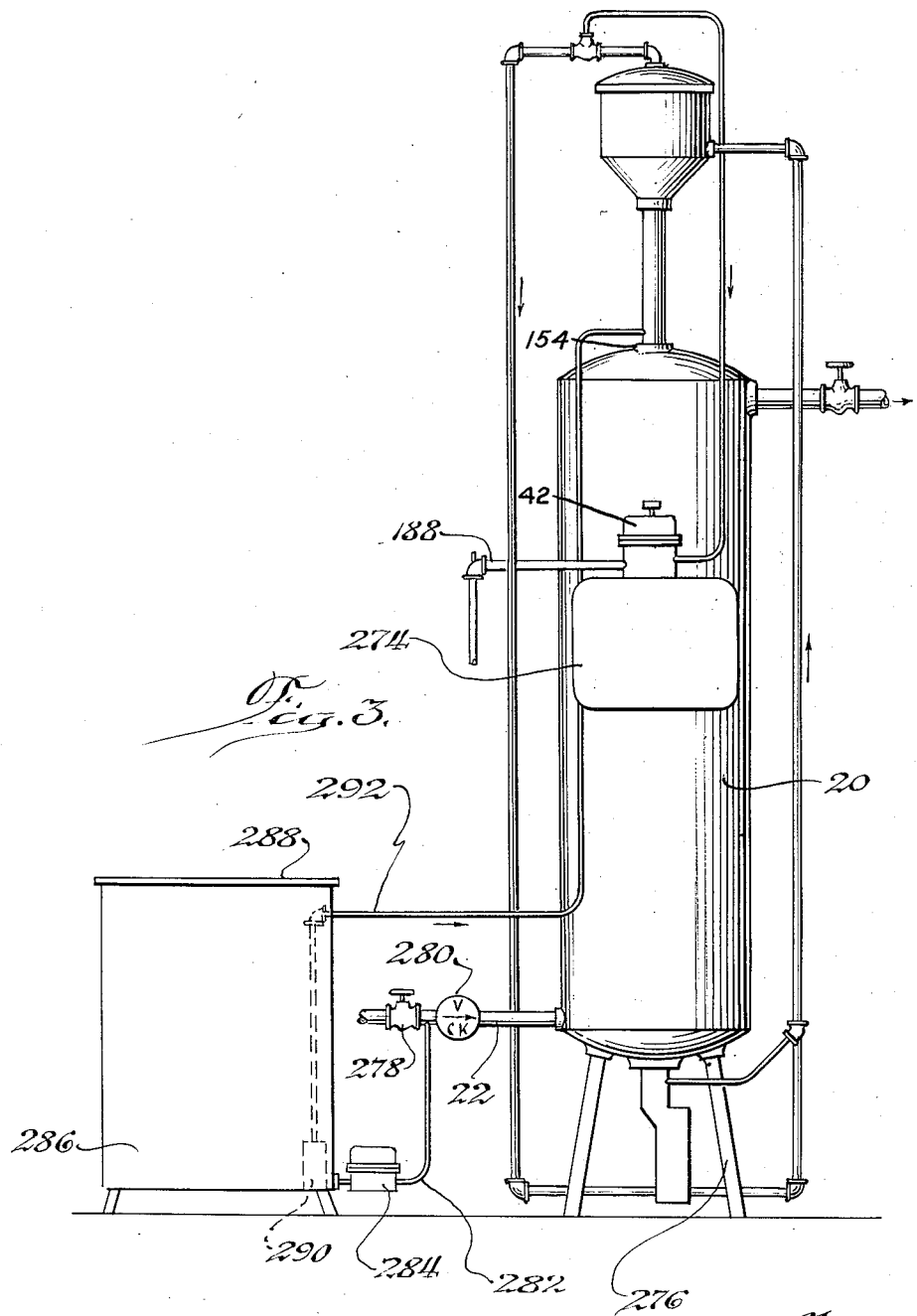

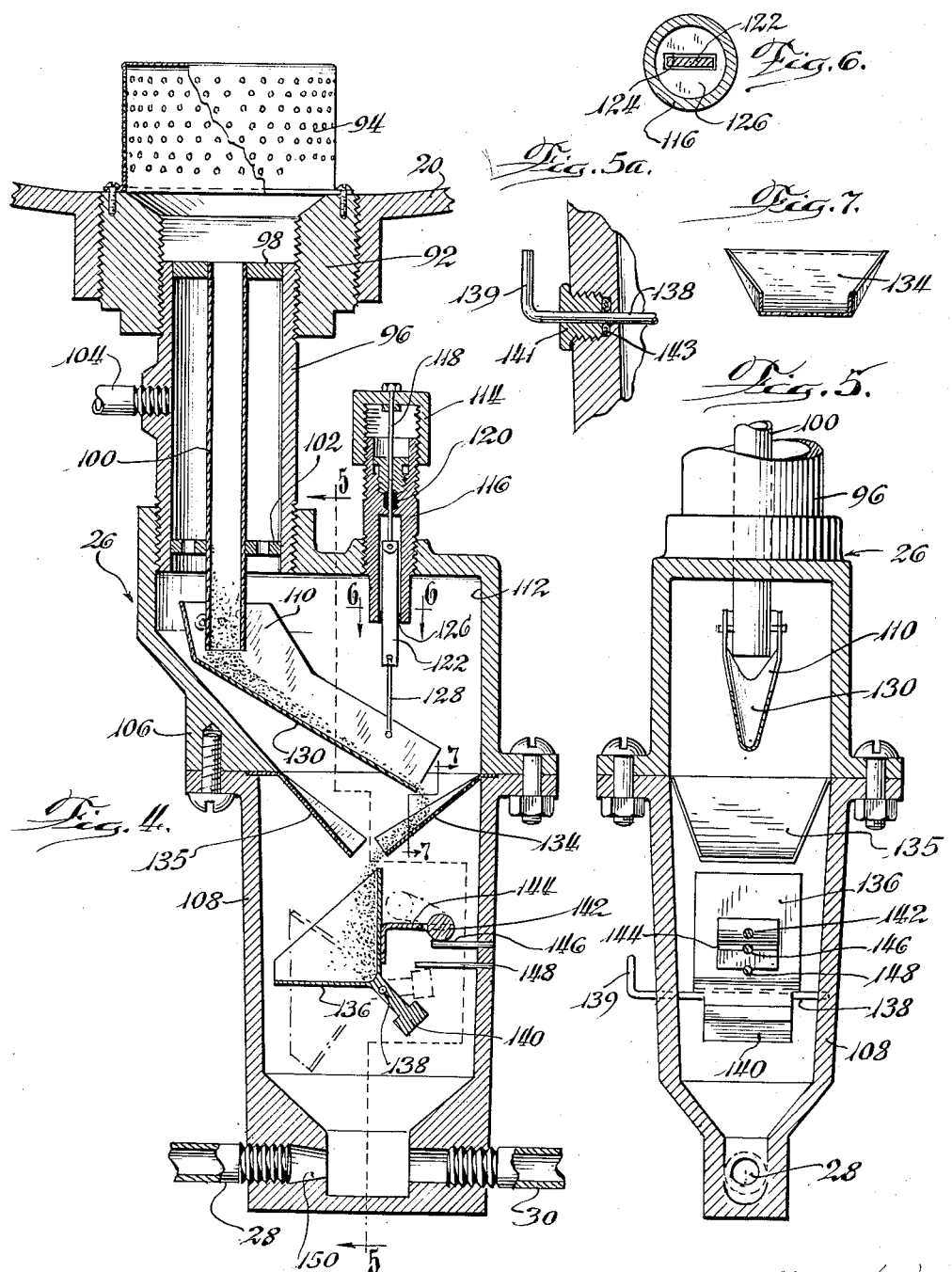

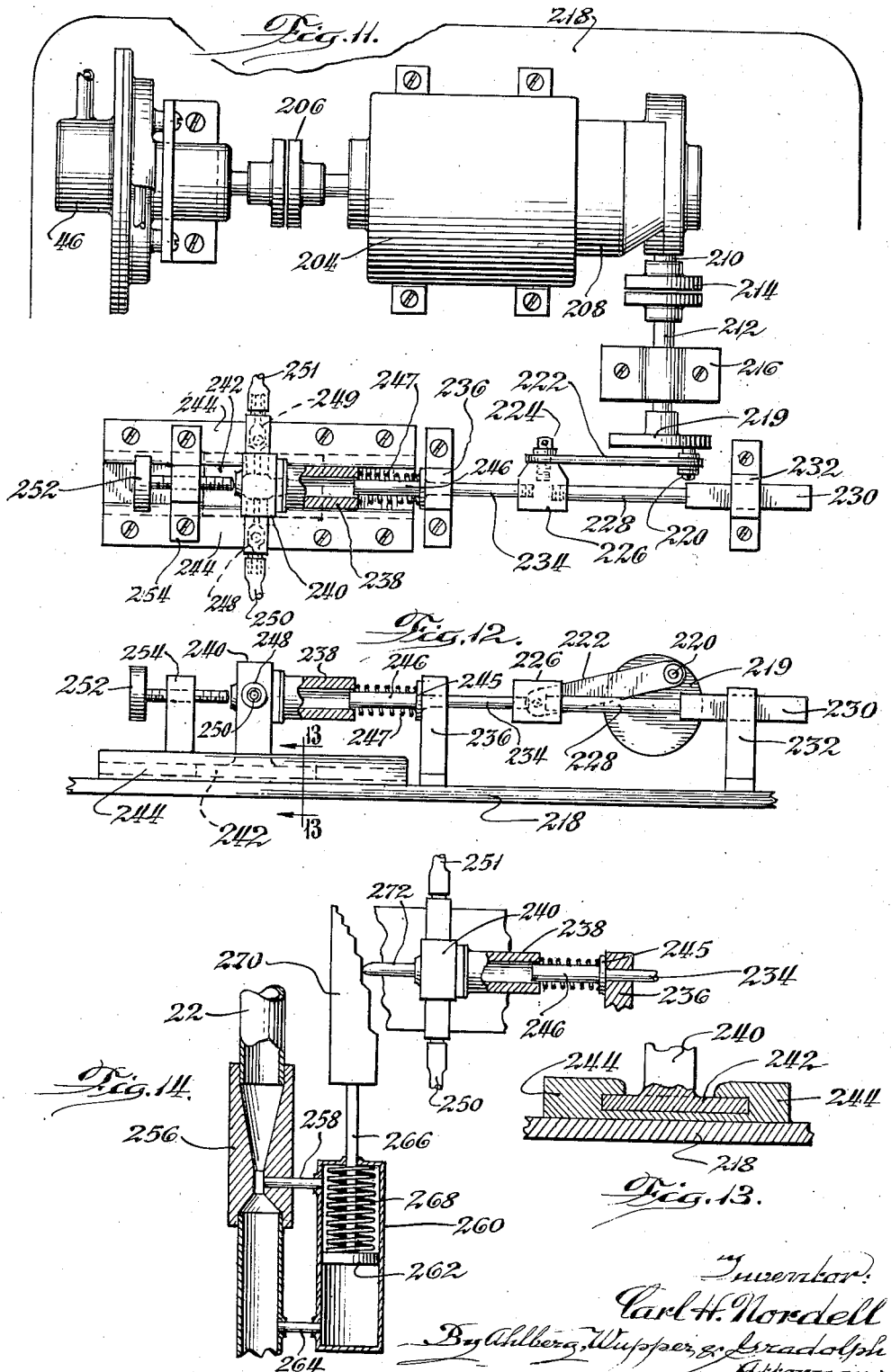

Sept. 16, 1958     C. H. NORDELL     2,852,464
METHOD AND APPARATUS FOR REMOVING
UNDESIRED SOLUTES FROM LIQUIDS
Filed Feb. 24, 1953     7 Sheets-Sheet 7
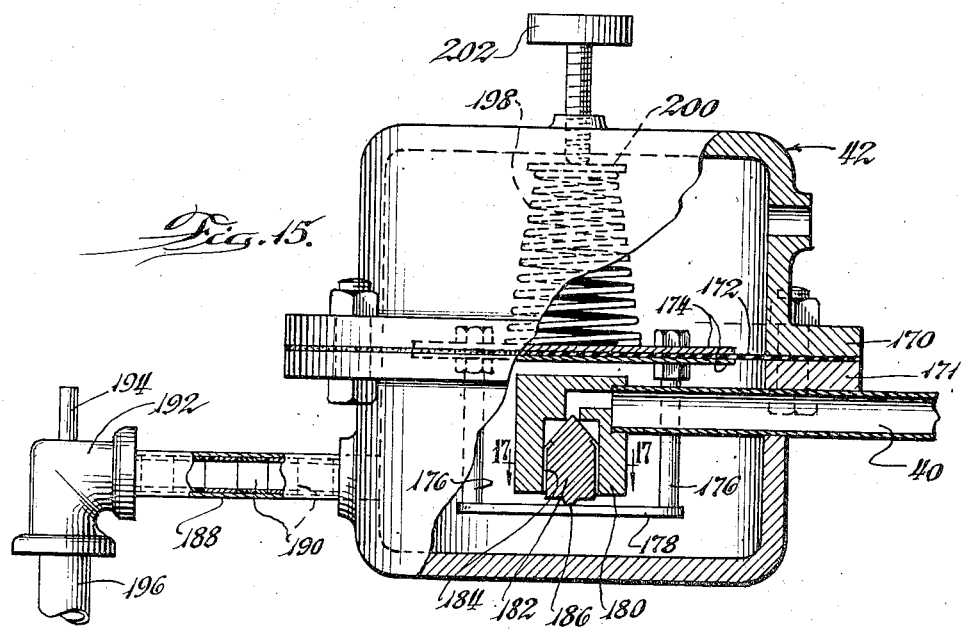
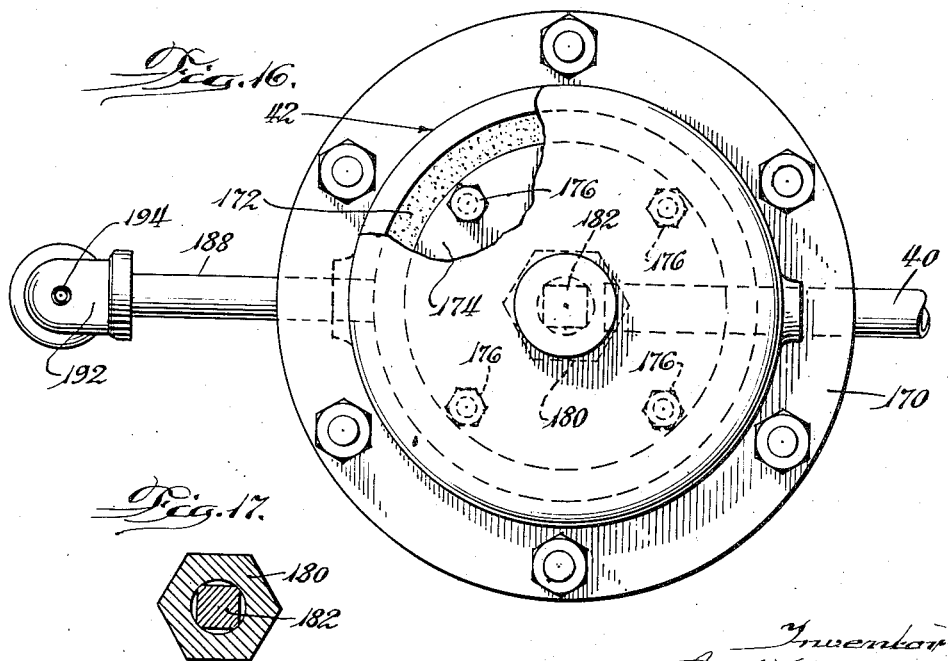
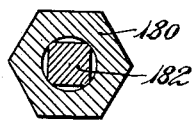

United States Patent Office

2,852,464
Patented Sept. 16, 1958

2,852,464

METHOD AND APPARATUS FOR REMOVING UNDESIRED SOLUTES FROM LIQUIDS

Carl H. Nordell, Crystal Bay, Nev., assignor of twenty-five percent to Louise N. Millspaugh, Long Beach, and twenty-five percent to Anne N. Kaspar, Scotia, Calif.

Application February 24, 1953, Serial No. 338,344

16 Claims. (Cl. 210—33)

This invention relates to the art of removing undesired solutes from liquids by means of anion and cation exchange substances of granular nature. This group of substances will hereinafter be referred to by the generic term "zeolites," even though they are resins or carbonaceous substances. For example, but not by way of limitation, the following substances are intended to be included in the term "zeolite": The natural zeolites, such as thomsonite, natrolite, laumontite, harmotome, stilbite, and processed materials such as greensand and sodium aluminosilicate.

These substances are employed in the process of water rectification and some refining processes, to remove anions or cations of soluble solutes by absorption and exchange. This is effected by filtering the liquids through a bed of zeolites.

Heretofore when the exchange power of the bed of zeolites was exhausted, it was cut out of service and regenerated by means of a regenerating solution which reversed the reaction and restored the exchange power to the bed of zeolites, after which it was rinsed and then restored to service. The bulk of water conditioning today is effected on this "batch" principle. Hence, the flow of fluid being rectified must be shut off at intervals for regeneration and rinsing of the zeolite, and during this time the rectifying unit is out of service.

As shown by my prior Patents Nos. 1,740,199 and 1,722,938, I have for many years felt that improvements could be made on this batch process of rectifying liquids by providing apparatus whereby the process would be continuous. The methods and apparatus shown in said patents did not, however, prove particularly successful commercially because they failed to incorporate some of the improvements set forth hereinafter.

The present invention provides a method and means for continuous flow of rectified liquid from the bed, because the zeolites are removed slowly and continuously from that portion of the bed where they are exhausted and are conveyed into chambers where they are regenerated, rinsed, and replaced in service, so there is maintained in the conditioning chamber at all times a bed of active zeolites to carry on the rectification process.

My aforesaid patents describe a continuous flow zeolite water softener in which the softening zone and washing zone employ the principle of counterflow, but the all-important regeneration zone employed the less efficient parallel flow.

Since the zeolite exchange process is one dependent upon mass reactions, employment of the counterflow principle in all steps of the process insures a completely finished liquid and the most economical use of the regenerant. To illustrate, the amount of regenerant commonly used is at least twice, and usually three or four times the amount required by theory. That is to say, the process of regeneration as practiced at present is very seldom over fifty percent efficient with respect to the use of the regenerant, and usually only about twenty-five to thirty percent. When the principle of counterflow regeneration is used, however, the efficiency is greatly increased, with resulting economies.

The novel process and apparatus herein disclosed provides for the counterflow regeneration of the zeolites, thus assuring the best reconditioning with the use of a minimum amount of regenerant.

In the method and apparatus disclosed in my aforesaid prior patents, the zeolites were lifted from the bottom to the top of the apparatus by the pressure of the liquid, and this in many cases was found quite unsatisfactory because of the variability of the water pressure from place to place and time to time, and the consequent stalling of the machine which would occur when the pressure was either too great or was insufficient.

This present invention eliminates this difficulty entirely by the use of a power operated pump and piping which sluices or conveys the zeolite from the bottom of the apparatus to the top gently and uniformly, unaffected by any variation in water pressure.

The continuous zeolite process described in my Patent No. 1,608,661 used the force of the flowing influent to move the zeolites and hence was open to the same objections as noted with respect to my other prior patents. Moreover, the process disclosed in this patent utilized the counterflow principle only for the rinsing step. In the process of my present invention the counterflow principle is utilized in all three steps, and a power operated pump is used to circulate the zeolites.

It is a further object to provide improved means for controlling the rate at which the zeolite is circulated throughout the system.

A further object is to provide an improved water treating apparatus in which the spent regenerant is substantially continuously vented to the drain.

A further object is to provide an improved water rectification process in which the water rectification tank, regeneration tank, and rinsing tank are at the same level, so that apparatus having a large treating capacity is not of excessive height, and so that the apparatus may be placed in buildings with low head room.

A further object is to provide apparatus of the type described, in which the zeolite is conveyed from the bottom of the rectification tank by a stream of water in which the zeolite granules are widely dispersed so as to minimize possible abrasion of the particles.

It is found that when a regenerant is added to many liquids which carry gases in solution, such gases are released and if allowed to mingle with the zeolite when it is flowing through a pipe, the bubbles of such gases act to stiffen a mass of granular zeolite, as, it is well known, occurs with a damp sand, and the stiffened mass of zeolite is apt to act as a plug in a pipe line. Therefore, it is a further object to provide means for automatically discharging gases thrown out of solution by the regenerant during operation of the apparatus.

A further object is to provide means for proportioning the rate of flow of the regenerant with the rate of flow of the water to be treated.

A further object is to provide an improved means for introducing the regenerant to the apparatus, which may readily be adapted for manual control in small capacity installations, or may be adapted for automatic proportioning control in large industrial installations.

A further object is to provide a method and apparatus for demineralization of water, in which the regenerant is continuously supplied to the apparatus to effect continuous regeneration of the zeolite, in which the regenerated zeolite is continuously rinsed, in which the rinsed regenerated material is continuously circulated through the water rectification tank, and in which the zeolite in each instance drops through the upwardly flowing regenerant, the rinsing liquid, and the water being rectified.

A further object is to provide a simplified and improved and less costly apparatus for the treatment of water to remove undesired solutes, and in which the cost of operation is substantially reduced as compared with prior apparatus and methods.

A further object is to provide water treatment apparatus which may be made for small capacity systems as well as for large capacities for municipal, institutional, and industrial use, and which will operate efficiently in both large and small capacity units.

Another object is to provide an improved continuous flow water treatment apparatus in which the regenerant tank is open to the atmosphere, and in which the reserve supply of the regenerant may be readily observed.

Other objects will appear from the following description, reference being had to the accompanying drawings, in which:

Fig. 1 is a schematic flow diagram of a simple form of the invention as applied to apparatus for softening water;

Fig. 2 is a similar flow diagram of an apparatus and method which may be employed in the demineralization and softening of water, particularly for large industrial installations;

Fig. 3 is a conventionalized elevational view showing an apparatus similar to that diagrammatically illustrated in Fig. 1;

Fig. 4 is a central vertical sectional view of the means for regulating and metering the flow of the zeolite;

Fig. 5 is a vertical sectional view, taken on the broken sectional line 5—5 of Fig. 4;

Fig. 5a is an enlarged fragmentary sectional view of the packing gland for the motor indicator;

Fig. 6 is a sectional view, taken on the line 6—6 of Fig. 4;

Fig. 7 is a fragmentary sectional view, taken on the line 7—7 of Fig. 4;

Fig. 8 is a fragmentary central vertical sectional view of the rinsing and regeneration chambers and associated apparatus;

Fig. 9 is a sectional view, taken on the line 9—9 of Fig. 8;

Fig. 10 is a sectional view, taken on the line 10—10 of Fig. 8;

Fig. 11 is an elevational view of the pump for the circulating water which carries the zeolite and also the pump for supplying the regenerant;

Fig. 12 is a bottom plan view of the regenerant pump;

Fig. 13 is a fragmentary sectional view, taken on the line 13—13 of Fig. 12;

Fig. 14 is a diagrammatic view of an improved means for proportioning the amount of regenerant pumped into the apparatus in accordance with the flow rate of the raw liquid;

Fig. 15 is an elevation, partly in fragmentary vertical section, showing a flow regulator, one of which may be used to regulate the flow of waste water, and another of which may be used to regulate the flow of feed of raw water to the regenerant tank;

Fig. 16 is a plan view of the regulator shown in Fig. 15; and

Fig. 17 is a sectional view, taken on the line 17—17 of Fig. 15.

The invention will be initially described with reference to Fig. 1, which discloses an apparatus which may be used for the removal of undesired solutes from a liquid. For the purpose of simplicity, the apparatus and method will be described as applied to water softening. In this diagram, as well as in others, the full line arrows represent the direction of flow of the liquid, while the dotted line arrows represent the direction of flow of the zeolite which term, it will be recalled, is intended to include materials having the properties of zeolites.

The apparatus is illustrated as comprising a main tank 20 to which the raw water is supplied through a pipe 22 which extends across the bottom of the tank and is provided with spaced apertures. The softened water is discharged through a pipe 24. A number of perforated baffles 21 are suitably secured in spaced relation in the lower portion of the tank. The hard water to be softened thus flows upwardly through the tank which contains a lose lying, constantly descending, bed of zeolite granules, thus bringing the hardest water into contact with the most nearly exhausted zeolite, then into contact with that of increasingly greater vitality, and finally the nearly soft water into contact with the freshly reconditioned zeolites, effecting complete softening.

At the lower end of the tank the zeolites drop into a zeolite transfer regulating and metering device 26, and at the bottom of this device the zeolites are picked up by the flow of circulating water flowing into the regulating device through a pipe 28 and carrying the zeolite outwardly through a pipe 30 to a settling chamber 32 which is at the top of a reconditioning stack 34. The zeolites which have settled in the chamber 32 descend by gravity through the stack 34 which contains a large number of baffles 36 to assure turbulent flow and adequate contact between the brine regenerant supplied through pipe 38 at approximately the midpoint of the stack 34, and similarly to provide adequate contact of the downwardly cascading zeolites with upwardly flowing rinse water supplied from the upper portion of the tank 20. A certain limited quantity of the water in the reconditioning chamber 32 is continuously withdrawn through a pipe 40, the rate of flow from this pipe to the drain being regulated by a suitable rate of flow controller 42.

The portion of the stack 34 above the connection to the pipe 38 may be termed the "regenerating zone," while the portion below may be termed the "rinsing zone," as indicated by the legends in Fig. 1. Substantially all of the space within the tank 20 may be termed the "softening zone," although except upon sudden withdrawal of large quantities of effluent, the zeolite bed will not expand to more than about two-thirds of the height of the tank 20.

As will more clearly appear hereinafter from the description of the metering device 26, a certain volume of water contained in the voids between the zeolite granules is transferred with the zeolite from the tank 20 to the conduit 30, and is thus introduced into the stream circulated by the pump 46 through the pipe 30. The rate of flow controller 42 is set so that a volume of water greater than the combined volume of the water thus introduced through the metering device 26, and that introduced with the regenerant 38, is discharged to waste so as to assure adequate flow of rinse water through the stack 34. In practice, the flow rate controller is set to permit flow substantially greater than the gross volumetric discharge of the zeolite metering device 26.

The main portion of the water supplied to the settling chamber 32 is withdrawn therefrom through pipe 44 and returned to pipe 28 by a pump 46. The function of the pump 46 is solely to overcome frictional losses in the pipes 28, 30, and 44, and the parts to which they are connected. It produces relatively slow flow of the water, just sufficient to entrain the zeolite and elevate it to the chamber 32 without causing undue abrasion of the zeolite granules.

As previously stated, the apparatus is intended for continuous operation, and for this purpose the brine or regenerant is metered by suitable means, hereinafter to be described, and the rate at which the zeolite is circulated in the system is controlled by the regulator and meter 26. Similarly, the spent brine and spent rinse water are continuously removed from the apparatus at a controlled rate through the rate of flow regulator 42. It will be observed that the liquid circulated by the pump 46, and which is utilized to elevate the zeolite, is of the same composition as the water which is voided to waste. It will be noted that the amount of circulating water employed in the system is constant and hence any fluctuations of water pressure in the main tank, or variations in the volume of flow through the main tank, are unaffected by the flow of circulating water and the pressure in the circulating system is governed by the pressure in the settling chamber 32. In other words, the sole purpose of the pump is to provide a flow of liquid to entrain the zeolite at the bottom of the tank 20 and carry it to the chamber 32 above the tank.

In industrial and other installations, when a large water softening capacity is required, the apparatus shown in Fig. 1 is preferably modified in order to reduce its overall height, making it convenient to install the apparatus in an enclosure of customary head room. In this apparatus, shown in Fig. 2, a primary tank 50 is provided with a raw liquid inlet pipe 52 at the bottom of the tank and a rectified liquid outlet pipe 54 at the top thereof. The primary tank 50 is provided with suitable foraminous partitions or baffles 56.

A pump 58 has an outlet pipe 60 connected to a zeolite flow regulating and metering device 62 at the bottom of the primary tank 50 and the liquid supplied to this device 62 picks up the granulated zeolite and discharges it through pipe 64 into a regeneration tank 66 a short distance from the top thereof. The zeolite settles from the upper portion of the tank 66 and falls by gravity past a plurality of perforated baffles 68 to the bottom of the tank. A part of the liquid supplied to the upper end of tank 66 flows therefrom through pipe 70 to the inlet of pump 58, while a smaller portion of this liquid is permitted to flow to waste through a branch pipe 72, the flow through which is controlled by a suitable rate of flow controller 74. The zeolites, as they reach the bottom of the tank 66, are picked up by the liquid discharge of a pump 76 and carried through a pipe 78 to the upper end of a rinse tank 80, where the zeolites settle and fall by gravity past a plurality of perforated baffles 82 to the bottom of this tank. The liquid is withdrawn from the upper end of the tank 80 through a pipe 84 which leads to the inlet of the pump 76.

The zeolite which settles to the bottom of the tank 80 is picked up by the discharge of a pump 85 and carried through a pipe 86 to the tank 50 a short distance from the upper end thereof, where the zeolites again drop by gravity to the bottom of the tank and the zeolite-free liquid is returned to the inlet of the pump 85 through a pipe 88.

It will be seen that the zeolites are circulated progressively through a rectification tank 50, a regenerant tank 68, and a rinsing tank 80. The zeolite is conveyed from the bottom of one tank in the series to the top of the next tank of the series by means of circulating water, and the zeolite descends by gravity in each of the three tanks. The regenerant is supplied to the bottom of tank 66 at a regulated flow rate through a pipe 90.

Since the tank 66 of the series has a regulated discharge to the atmosphere through the rate of flow controller 74, the pressure in said tank necessarily falls somewhat lower than that in the tank 80, and since this pressure is lower the pump 76 will not return through the pipe 78 quite as much water as is supplied to the pump through the pipe 84. Hence, a portion of the water which passes through the pump 76 will not enter the pipe 78 but will flow upwardly through tank 66, carrying with it the regenerant which has been forced in through pipe 90. This amount of water thus diverted, plus the amount of regenerant, will precisely equal that which is permitted to escape to the drain through the flow controller 74. Similarly, due to the differences in pressure, a certain proportion of the liquid discharged by pump 85 is diverted into the lower end of the tank 80 and flows upwardly against the descending zeolites to rinse the latter, and some of this water ultimately will be returned through the discharge of pump 76 to the lower end of tank 66 and will thus be discharged to the drain through the rate of flow controller 74. The upward flow in tank 80 is precisely equal to that discharged through the rate controller 74, less the amount of regenerant which has been added. The rate of flow controller 74 is set and operates in the same manner as the rate of flow controller 42 previously described.

Having described the general principles of the improved method and the general construction of two forms of the apparatus employed in carrying out these methods, the preferred construction of various portions of the apparatus will now be described.

One of the more important parts of the apparatus is the device (26 in Fig. 1 and 62 in Fig. 2) for regulating and metering the flow of zeolite from the tank 20 into the circulating system, which is best shown in Figs. 4 and 7.

A bushing 92 is threaded in the bottom of the tank 20 and has a coarse strainer 94 secured thereto. Threaded in the bushing 92 is a support and air trap pipe 96. The upper end of this is plugged by an apertured plate 98 carrying a tube 100, the lower end of this tube being supported by a perforated plate 102. An air vent tube 104 is threaded in the side of the support pipe 96, this tube leading to the conduit 30 in the embodiment shown in Fig. 1 (and to the conduit 64 in the embodiment shown in Fig. 2), at a point elevated with respect to the support pipe 96.

A pair of flanged castings 106 and 108 are fastened together and form a housing for the regulating and metering mechanism. The latter comprises a chute or trough 110 suitably hinged to the lower end of the tube 100 which projects into the upper end of chamber 112 within the housing 106, 108. The slope of the trough 110 is adjusted by means of a cap nut 114 threaded on a suitable fitting 116 which is threaded in the upper end of casting 106. A rod 118 is rotatably secured to the nut 114 and projects through a suitable packing gland 120 and is swiveled to a flat bar 122 which projects through a rectangular slot 124 formed in a disc 126 pressed in the lower end of fitting 116. A link 128 pivotally connects the bar 122 and the trough 110. Thus, by rotation of the nut 114, the slope of the trough 110 may be readily adjusted.

The zeolite supplied through the tube 100 slides downwardly in the trough 110 with an upper surface approximately as indicated by the dots. There is a critical slope to which the trough may be adjusted at which the flow of zeolite will start. As the slope is increased, the rate of flow will correspondingly increase. Thus by adjustment of the nut 114 the rate of flow may readily be regulated between certain limits. It has been found that the zeolite passing through the strainer 94 fills the space therein and fills the pipe 100, and that the passage of the zeolite granules through the pipe 100 and the manner in which it slides down the trough 110, occurs in substantially the same manner as if the zeolite were surrounded by air instead of water.

The zeolite granules in the tube 100 form a hydraulic resistance to flow of liquid from the tank 20 to the chamber 112. Any air which is released from the liquid in the chamber 112 flows through the perforations in plate 102 and tube 104, and eventually is discharged from the system through pipe 40 and controller 42.

The zeolite discharged from the trough 110 is directed by a pair of sloping baffles 134, 135 to a measuring bucket 136 pivoted on a rod 138 which bears in packing gland 141 (Fig. 5a) which includes an O-ring seal 143. As shown in Fig. 5, the end of the pintle or rod 138 is bent at right angles to provide an indicator 139 to show that the bucket 136 is operating, giving a visual indication of the frequency of discharge of the bucket. In large installations the indicator 139 may be mechanically connected to a counter, or operate a switch in a circuit to provide remote indication of the operation of the zeolite meter.

A counterweight 140 is secured to the bucket and is of such weight as to balance the empty bucket on the pivot pin 138. A second counterweight 142 is secured to the bucket 136 by a bracket 144 and is of such weight as to balance the desired amount of zeolite required to tilt the bucket 136. A pair of limit stops 146 and 148 are secured in the wall of the casting 108 and cooperate respectively with the counterweights 142 and 140 to limit the tilting motion of the bucket. These stops are preferably made in the form of brass bars so as to provide an acoustic signal as the counterweights strike them. Thus an attendant may readily determine the rapidity at which the zeolite is being metered by the tilting of the bucket 136.

A packing gland is desirable, as shown in Fig. 5a, for the end of the rod which is bent over to provide the indicator 139. However, in small installations where the weight of the zeolite metered by the bucket 136 is very small, the packing gland would, due to friction, introduce an uncertainty into the operation of the bucket in its metering function. In such cases both ends of the rod 138 project into suitable bearing holes drilled in the casting 108, the outer ends of these holes being suitably plugged. In this type of construction the acoustic signal produced when the counterweights strike the bars 146, 148, is relied upon as an indicator of the frequency of operation of the metering bucket 136.

The zeolite granules dumped from the bucket 136 whenever the weight thereof is sufficient to overcome the counterbalance weight 142, fall into the stream of liquid discharged by the pump 46 (Fig. 1) through the pipe 28, and into the pipe 30, these pipes being threaded in the lower end of the housing casting 108.

As previously indicated, the rate of the zeolite regulated by the adjustment of the trough 110 is such that the zeolite granules are dispersed so that there is very little abrasion between the particles, and the rate of flow is so relatively slow that the abrasion of the granules against the walls of the pipes is not severe.

It should be noted that the tube 100, normally filled with granules of zeolite, forms a substantial resistance to the flow of raw water from the tank 20 to the chamber 112. There is, however, a slow trickle of raw water from the tank 20 to the chamber 112, provided the pressure within the tank 20 is greater than that in the chamber 112. It has been found that a fluctuation in this differential pressure is of practically no effect in altering the sliding velocity of the granules in trough 110, and hence the rate at which zeolites drop from the tank 20 is unaffected by these pressure differential fluctuations which occur as the flow of water to and the discharge from the tank 20 is varied. In general, the pressure in the tank 20 will be greater than the pressure in the chamber 112, because the pressure in the bottom of the tank 20 is always greater than the pressure in the top of the tank when raw water is flowing into it as the water in its upward course through the tank is subjected to the frictional resistance of the zeolite bed. Since the upper part of tank 20 is in open communication with the reconditioning stack 34, and the friction loss through the pipe 30 from the regulating and metering device 26 to the settling chamber 32 is slight and not as great as the loss of pressure from bottom to top of the tank 20, the pressure in the chamber 112 is less than that in the bottom of the tank 20. There will therefore be no tendency for upward flow from the chamber 112 to the tank 20, but as previously indicated, there will usually be a slow trickle of liquid in the reverse direction.

The ends of the pipes 28 and 30 are in alignment and the opening for the pipe 28 is conical as indicated at 150, to achieve a nozzle effect to impress enough kinetic energy on the flow from the pipe 28 to overcome the entrance loss into the pipe 30 and the frictional loss in this pipe.

The flow of liquid from pipe 28 and nozzle 150 to the pipe 30 has a sufficient aspirating effect on the liquid within the chamber 112 to balance the frictional losses in the pipe 30.

The rinsing and regenerating stack 34 and associated parts may be constructed in the manner shown in Figs. 8, 9, and 10. The stack 34 consists of a pipe 153 threaded in a bushing 154, which in turn is threaded into the upper end of the tank 20. A tube 155 is threaded in the lower end of pipe 153 and forms an extension thereof. Within the stack 34 are a plurality of baffles 156 separated by hollow cylindrical spacers 158 which are assembled in the stack, the lowermost baffle 156 resting on an inturned flange 160. The casing forming the settling chamber 32 has a baffle 162 secured to its top. The end of the pipe 30 which projects into the chamber 32 has an elbow 165 secured thereto to impart swirling motion to the liquid in the chamber.

An enlarged T fitting 166 is suitably secured in the pipe line 44 and includes a strainer 168 to prevent the possibility of the passage of any particles to the rate of flow control device 42 which might clog the latter.

A simple form of flow rate controller which is adequate to regulate the waste water flow is shown in Figs. 15 to 17. This regulator 42 comprises two similar casing halves 170, 171, which are clamped together about a flexible diaphragm 172. Suitable reinforcing plates 174 are bolted on either side of the central part of the diaphragm 172 by means of four studs 176, the lower ends of these studs being threaded in a plate 178. The waste water pipe 40 extends through the lower casing half 171 and has a valve seat member 180 secured thereto. A polygonal section valve 182 is freely reciprocable in a bore 184 formed in the member 180, and has a centering dimple 186 normally in contact with the plate 178. The waste water which flows past the valve 182 is discharged through a tube 188 which has a plurality of spaced orifice baffles 190 therein. An elbow 192, having a vacuum breaker air vent tube 194 projecting upwardly therefrom, is secured to the end of the tube 188. A pipe 196 threaded in the elbow 192 leads to the drain.

The valve 182 is normally biased to open position by the force of a compressed conical coil spring 198, the upper end of which is pressed against a saddle plate 200, the position of which may be adjusted by means of a thumb screw 202, and the lower end of which rests upon the upper diaphragm plate 174. As the pressure within the lower housing increases, the diaphragm 172 is flexed upwardly and thus moves the valve to closed position. As the pressure in the lower casing half 171 is reduced to permit escape of liquid past the series of orifice plates 190, the spring 198 will flex the central portion of the diaphragm downwardly and thereby open the valve. After a short time the force due to the pressure in the lower part of the casing which operates as a hydraulic head for the discharge of water through the series of orifice plates 190, will equal the downward force of the spring 198 and the diaphragm 172 will come into a state of equilibrium whereby water is allowed to trickle past the valve 182. The pressure in the line 40 is city water pressure or such pressure as exists in the tank 20, and usually has values ranging from 20 to perhaps 150 p. s. i., whereas the pressure in the lower casing half 171 will ordinarily be less than one foot head of water.

The purpose of this great reduction in pressure is so that the desired small amount of water may be discharged through the orifice plates 190 without involving the use of very small orifices which might become clogged by chance particles. On some of the small household softeners, this flow must be only at the rate of approximately a gallon per hour, and in order not to have too small an orifice, that is, less than, say, $1/16$ or $3/32$ of an inch, the number of orifice plates sufficient to choke back the flow may be numbered almost by the dozen, but owing to the simple construction of the orifice tube, this does not induce any excessive cost. For the larger units treating considerable amounts of water, any of the recognized flow controllers now on the market may be used.

The circulating water pump 46 and the regenerant pump may assume the form shown in Figs. 11 to 13. The pump 46 may be of any well known centrifugal type and is driven by a motor 204 through a flexible coupling 206. A speed reducing gearing is enclosed in a housing 208, which may be part of the motor housing, and drives a shaft 210 at a speed which may be $\frac{1}{200}$ to $\frac{1}{400}$ of that of the motor shaft. The shaft 210 is connected to a shaft 212 through a flexible coupling 214, the shaft 212 extending through a bearing block 216 secured to a panel 218 upon which the motor 204 and pump 46 are also mounted. A crank plate 219 is suitably secured to the end of the shaft 212 and has a crank pin 220 secured thereto. A connecting rod 222 has one end pivoted on the pin 220 and has its other end pivotally secured to a pin 224 secured in a cross head 226. A guide rod 228 has a square end portion 230 slidably mounted in a bearing 232. The other end of the rod is threaded in the cross head 226. An actuating rod 234 is threaded in the cross head 226 in alignment with the guide rod 228 and slides in a bearing 236. A pump cylinder 238 has a head 240 having side flanges 242 (Fig. 13) guided in suitable ways 244 secured to panel 218. A plunger 246 is reciprocable in the cylinder 238, being biased to move outwardly by a spring 247 compressed between the head 245 of the plunger and the end of cylinder 238. An inlet check valve fitting 248 and an outlet check valve fitting 249 are threaded in the head 240 and are in communication with the interior of the cylinder 238. The fittings 248 and 249 are connected by hoses 250 and 251 to the source of regenerant and to the stack 34, respectively. In the form of the invention shown in Fig. 2, the hose 251 is connected to pipe 90.

The effective stroke of the plunger 246 may be adjusted by means of an adjusting screw 252 threaded in a block 254 secured to the ways 244. As the actuating rod 234 is reciprocated its end will engage the plunger 246 to move the latter against the force of the spring 247, thereby forcing the liquid contents of the cylinder 238 through the outlet check valve fitting 249. The effective stroke of the plunger 246 is determined by the position of the adjusting screw 252. Upon retraction of the operating rod 234, the plunger 246 will be retracted by the spring 247 and suck in liquid through the inlet check valve fitting 248. By means of this regenerant pump the amount of regenerant fed may be varied through a wide range and the flow rate is accurately maintained.

In some installations it is desirable to proportion the rate at which the regenerant is pumped to the inflow of raw water. This may be accomplished by an apparatus diagrammatically illustrated in Fig. 14. It will be observed that in Fig. 14 the pump parts are the same as those previously described with reference to the pump shown in Fig. 12, and the same reference characters have been applied to corresponding parts.

The raw water supply pipe 22 in Fig. 1 (or 52 in Fig. 2) has a Venturi nozzle 256 connected therein. A tube 258 connects the throat of the Venturi nozzle 256 to one end of a hydraulic cylinder 260 in which a piston 262 is reciprocable. A tube 264 connects the other end of the cylinder 260 to the pipe 22 so that the lower end of the cylinder is subjected to static head while the upper end of the cylinder is of lower pressure, depending upon the rate of flow of raw water through the nozzle 256. The piston 262 is secured to a piston rod 266 and is biased to move downwardly by a compression coil spring 268. The piston rod 266 carries a stepped stop plate 270 against which an adjusting rod 272 secured to the slidable head 240 of the pump may bear. The end of the rod 272 is wedge-shaped so that it may be cammed away from the stepped edge surface of the stop plate 270 as the latter moves upwardly successive steps.

It will be understood that the actuating rod 234 will ordinarily move away from the plunger 246 during each stroke, so that but a small force will be required to slide the pump to the right. Thus if the rate of flow of raw water through the Venturi nozzle 256 increases, the decreased pressure in the upper end of the cylinder 260 will cause the piston 262 to be raised and the stepped edge of the plate 270 may therefore cam the cylinder 238 to the right during the interval that the operating rod 234 is not in contact with the head 245.

There are many forms of commercial proportioning devices on the market which can be used, or be adapted for use, in place of the regenerant pumping mechanism disclosed.

Referring to Fig. 3, the pumping mechanism shown in Figs. 12 and 13 is preferably mounted within a casing 274 secured to the panel 218, which in turn may be suitably secured to the tank 20. The tank is illustrated as being mounted upon a plurality of legs 276. The flow of raw water to the pipe 22 is controlled by a hand valve 278 and a check valve 280. A tube 282 is connected intermediate these two valves and leads to a feed water regulator 284 which connects to the lower end of a regenerant or salt tank 286. This tank is preferably at atmospheric pressure, having a loose cover 288 which may be hinged to the tank for determining the amount of salt or other regenerant therein. The feed water regulator 284 may be of any suitable commercially available type which will maintain a predetermined water level within the tank 286, or may be of the type shown in Figs. 15 to 17, except for the omission of the orifice tube 188.

The brine is withdrawn from the bottom of the tank 286 through a strainer 290 connected to the pipe 292 leading to the inlet of the regenerant pump.

In the use of the apparatus to prepare it for operation in the first instance, the zeolite is inserted by disconnecting the bushing 154 and pouring a charge of zeolite into the top of the tank 20, and replacing the bushing 154 and the parts connected thereto.

The tank 286 is charged with the regenerant which in most instances will consist of sodium chloride, but may consist of other sodium salt, or, where readily available, sea water. For demineralization, sulphuric acid will usually be used as the regenerant. The raw water valve 278 may then be opened and the tank filled. The regulators 42 and 284 are adjusted and the motor 204 energized to start the plant in operation. The zeolite will then be picked up from the regulating and metering device 26 and conveyed to the settling chamber 32, and will drop downwardly through the regenerating stack 34 and through the rinsing portion of this stack.

As the zeolite granules pass through the regenerating zone of the stack 34, there will ordinarily be turbulent flow to secure adequate contact of the regenerant with the zeolite granules, and similarly, in the rinsing zone such turbulence will insure complete washing of the regenerant from the zeolite granules so that the zeolite entering the tank 20 will be fully regenerated and washed free of the regenerant.

The baffles 21 are of such shape that they do not materially interfere with the settling of the zeolite granules, but slow down the falling of the particles and prevent channeling of raw water through the zeolite bed.

The manner in which the escape of zeolite from the bottom of the tank 20 is regulated and metered was fully described in connection with the description of Figs. 4 and 5, and the manner in which the metered zeolite is sluiced to the settling chamber 32 has also been fully described.

Upon properly adjusting the rate of flow control device 42 and the feed water regulator 284, as well as adjusting the stroke of the regenerant pump by means of the adjusting screw 252, checking the frequency of operation of the metering bucket 136, and adjusting the slope of the trough 110, the apparatus will be in condition to operate continuously for many months without further attention. Ultimately the zeolite may have to be replaced and of course the regenerant will have to be added to the tank 286 at intervals to replace that which is wasted.

The various tanks, pipes, and other parts of the apparatus are preferably lined with a material, such as rubber, which does not react with the regenerant being used, or are made of materials which do not react with the regenerant. The purity of the effluent and long useful life of the apparatus are thus assured.

While I have shown and described preferred embodiments of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. The method of lifting zeolites which consists of circulating a current of spent regenerant and rinse water in a closed circuit between a high point and a low point, entraining said zeolites in said current at said low point, separating said zeolites from the liquid at said high point, and returning the current of liquid in a closed circuit in undiminished volume to the low point again in continuous circulation.

2. The method of continuously softening water in a closed circuit which consists of dropping zeolite through a regenerating zone, elevating the zeolite from the bottom of the regenerating zone to the top of a rinsing zone by circulating water withdrawn from the top of the rinsing zone and pumped through the bottom of the regenerating zone and back to the top of the rinsing zone, then dropping the zeolite through the rinsing zone to the bottom thereof and elevating it to the top of the softening zone by means of water withdrawn from the top of the softening zone pumped through the bottom of the rinsing zone and returned again to the top of the softening zone, then dropping the zeolite through the softening zone and elevating it back to the top of the regenerating zone by means of water withdrawn from the top of the regenerating zone and pumped through the bottom of the softening zone and returned to the top of the regenerating zone, admitting raw water near the bottom of the softening zone, withdrawing effluent from the top of the softening zone, and maintaining an upwardly flowing stream of liquid successively through the softening zone, rinsing zone and regenerating zone substantially to the exclusion of downflow in the opposite direction of liquid and all material except the zeolite whereby all downflow is of zeolite.

3. In a water softening apparatus having a tank for containing a bed of zeolite and having a raw water inlet and effluent outlet, a housing secured to the bottom of said tank and containing means forming a tubular passageway extending downwardly from the bottom of said tank, a trough-like member pivotally secured adjacent and extending beneath the lower end of the tube, manually operable means for adjusting the slope of said trough-like member, a tilting bucket receiving the zeolite from the trough-like member and having two operative positions, one in which it is being filled and the other in which the contents are discharged, and means for indicating movement of said bucket; closed circuit means for regenerating and rinsing the zeolite including a first conduit for hydraulically conveying the zeolite dumped by the bucket to the inlet of the regenerating and rinsing means, and a pump and a second conduit for circulating liquid from a point adjacent the inlet of the regenerating means to a space below the bucket for picking up and conveying the zeolite through said first conduit.

4. In a water softening apparatus of the continuously operating type having a water softening tank, means for conveying spent zeolite from the bottom of the water softening tank to a regenerating chamber comprising, a tube connected to the bottom of the softening tank for collecting and compacting spent zeolite, adjustable means at the lower end of said tube for controlling the rate of discharge of zeolite therefrom, a meter operating to separate zeolite discharged from said tube into portions of equal weight, means forming a closed liquid circulating path one portion connecting the lower end of the meter with the upper end of the regenerating chamber, and the other portion thereof including a pump and connecting the upper end of the regenerating chamber with the lower end of the meter, whereby the metered zeolite will be hydraulically conveyed from the lower end of the metering means to the upper end of the regenerating chamber.

5. The method of softening water which comprises, dropping zeolite particles in a continuous, cascade successively through a regenerating zone, a rinsing zone, and into a softening zone, conveying the zeolite from the bottom of the softening zone to the top of the regenerating zone by circulating liquid drawn from the top of the regenerating zone and returning it to the top of the regenerating zone carrying with it entrained zeolite picked up from the bottom of the softening zone, introducing raw water at the bottom of the softening zone, withdrawing the softened water at the upper end of the softening zone, supplying rinse water at the bottom of the rinsing zone, supplying a regenerant at the bottom of the regenerating zone, maintaining an upwardly flowing stream of liquid through all of said zones successively in the adverse order relative to dropping of zeolite particles to the exclusion of downward flowing of liquid and all material except the zeolite particles whereby all downflow is solely of zeolite particles, and withdrawing liquid from the top of the regenerating zone and conveying it to waste.

6. The method set forth in claim 5, in which the rate at which the zeolite is conveyed from the bottom of the softening zone to the rinsing zone is regulated and metered independently of the flow of said circulating liquid.

7. The method set forth in claim 5 in which the withdrawal of liquid from the top of the regenerating zone and conveyance to waste is at a rate less than the rate of flow of the circulating liquid.

8. The method set forth in claim 5 in which the rinse water is constituted by a portion of the softened water.

9. The method set forth in claim 2, in which a regenerant is supplied to the bottom of the regenerating zone and flows upwardly with the liquid therein and thus counter to the zeolite dropping therein.

10. The method set forth in claim 2 in which liquid is drained off from the top of the regenerating zone at a rate less than the rate of flow of the circulated water.

11. In a liquid rectification system, the combination of means forming three interconnected chambers, the first being a regenerating chamber at a relatively high level, the second being a rinsing chamber at an intermediate level, and the third being a softening chamber at a lower level, means for introducing raw water near the bottom of the softening chamber, means for withdrawing effluent near the top of the softening chamber, means for introducing a regenerant at the bottom of the regenerating chamber, a collector below and communicative with the softening chamber to cause the zeolite to be compacted, a regulator adjacent the collector to control the rate of discharge of zeolite therefrom, a constant flow pump having its inlet connected to the top of the regenerating chamber, conduit means for conducting a stream from the outlet of the pump into engagement with zeolite in the regulator and to the upper end of the regenerating chamber for hydraulically conveying the spent zeolite from the regulator to the regenerating chamber, the chambers and connections thereto constituting a closed circuit defining a closed path for movement of zeolite through the chambers solely in downward direction and movement of liquid therethrough solely in upward direction, and means for discharging liquid from the top of the regenerating chamber to the drain at a controlled rate.

12. The combination set forth in claim 11 in which gravity operated meter means is included for indicating the rate of discharge of zeolite from the collector.

13. The combination set forth in claim 12, in which a reciprocating pump is utilized to introduce the regenerant, and in which venturi means in the raw water introducing means are provided to change the effective stroke of the pump in response to changes in the rate at which raw water is introduced to the softening chamber.

14. Water softening apparatus comprising, tank means defining a regenerating zone, a rinsing zone, and a softening zone respectively intercommunicating for downward flow of zeolite therethrough serially in the order stated, means for introducing raw water into the softening zone at the bottom thereof, means for withdrawing softened water from the softening zone at the top thereof, and means forming a closed circuit for hydraulically lifting zeolite from the bottom of the softening zone for enabling it to drop through the zones serially in the order named, means for withdrawing liquid for this purpose from the top of the regenerating zone, means for introducing regenerant into the regenerating zone at the bottom thereof, the flow of liquid through said zones being solely in upward direction.

15. Water softening apparatus comprising, tank means forming a regenerating chamber space, a rinsing chamber space and a softening chamber space, the chamber spaces being interconnected serially in the order named for flow of zeolite downwardly successively therethrough in the same order and reverse flow of liquid serially therethrough, means for introducing raw water at the bottom of the softening chamber space and withdrawing softened water at the top thereof, means for introducing regenerant at the bottom of the regenerating chamber space, and closed circuit means for hydraulically lifting zeolite for enabling it to drop through the chamber spaces as stated.

16. Water softening apparatus comprising a tank, means forming a chamber above the tank, a stack leading from the chamber downwardly into the tank and terminating below the top thereof, said stack having transverse baffles therein, means for introducing raw water into the tank at the bottom thereof, means for withdrawing softened water at the top of the tank above the bottom end of the stack, means for introducing regenerant into the stack intermediate the ends thereof, and closed circuit means for withdrawing liquid from the top of the chamber, picking zeolite from the bottom of the tank and introducing the liquid with the zeolite so picked up into the chamber at a point below that at which the liquid is withdrawn.

References Cited in the file of this patent

UNITED STATES PATENTS

| | | |
|---|---|---|
| 989,942 | Bain | Apr. 18, 1911 |
| 1,707,302 | Godsey | Apr. 2, 1929 |
| 1,726,082 | McLaughlin et al. | Aug. 27, 1929 |
| 1,740,199 | Nordell | Dec. 17, 1929 |
| 1,752,339 | Green | Apr. 1, 1930 |
| 1,770,580 | Neumann | July 15, 1930 |
| 1,961,595 | Pardee | June 5, 1934 |
| 2,073,388 | Elliott et al. | Mar. 9, 1937 |
| 2,320,147 | Layng et al. | May 25, 1943 |
| 2,528,099 | Wilcox et al. | Oct. 31, 1950 |
| 2,550,955 | Berg | May 1, 1951 |
| 2,590,148 | Berg | Mar. 25, 1952 |
| 2,597,693 | Wolcott | May 20, 1952 |

UNITED STATES PATENT OFFICE
CERTIFICATE OF CORRECTION

Patent No. 2,852,464                                          September 16, 1958

Carl H. Nordell

It is hereby certified that error appears in the printed specification of the above numbered patent requiring correction and that the said Letters Patent should read as corrected below.

Column 12, line 36, claim 5, for "adverse order" read -- reverse order --.

Signed and sealed this 30th day of December 1958.

(SEAL)
Attest:

KARL H. AXLINE                                              ROBERT C. WATSON
Attesting Officer                                         Commissioner of Patents